Dec. 30, 1947.  R. R. FISHER  2,433,750
ELECTRICAL HEATING DEVICE
Filed Feb. 23, 1946  2 Sheets-Sheet 2
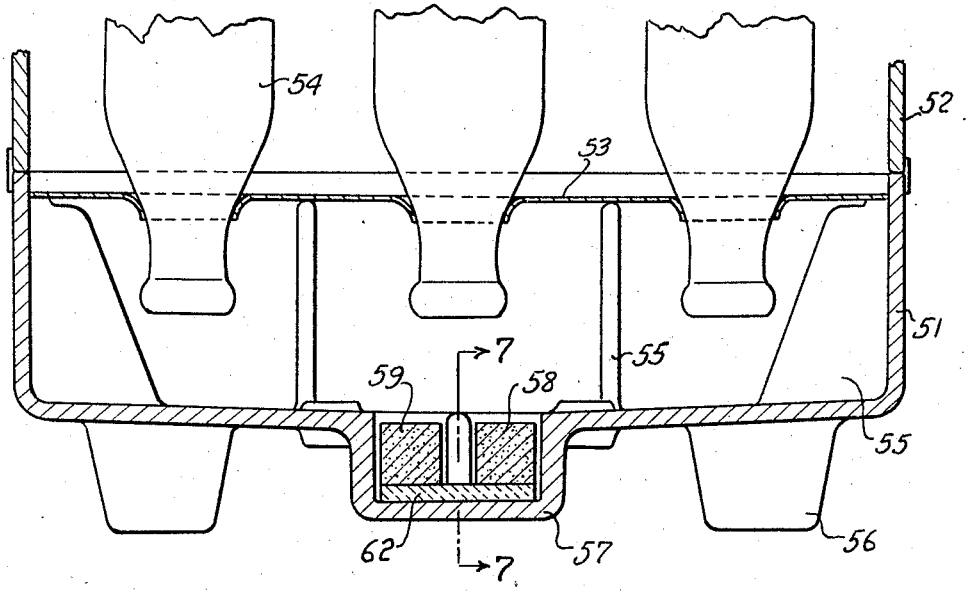
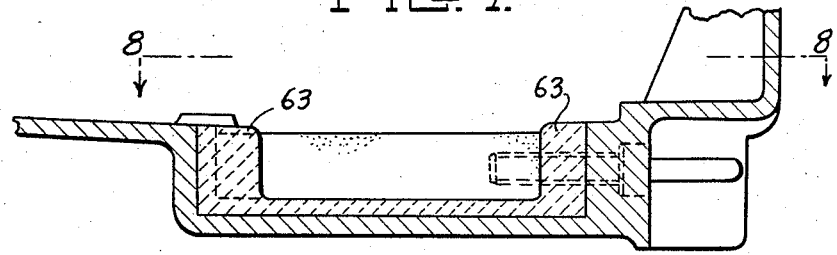
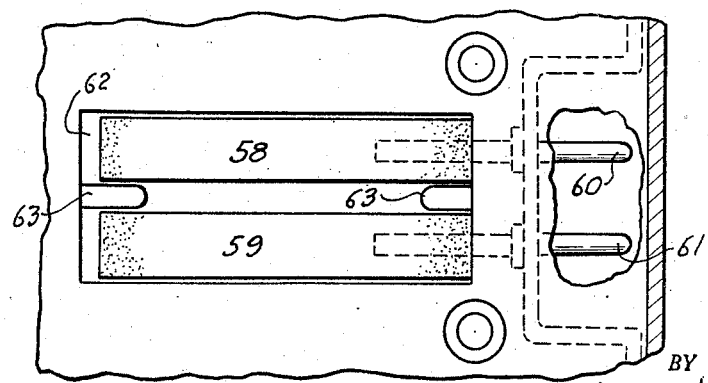
INVENTOR.
Roy R. Fisher
BY
Barnes, Kisselle, Laughlin & Raisch
INVENTOR Patented Dec. 30, 1947

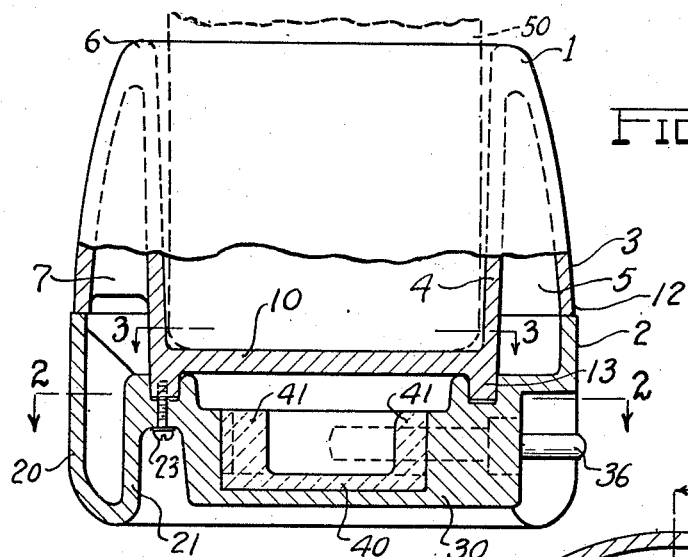
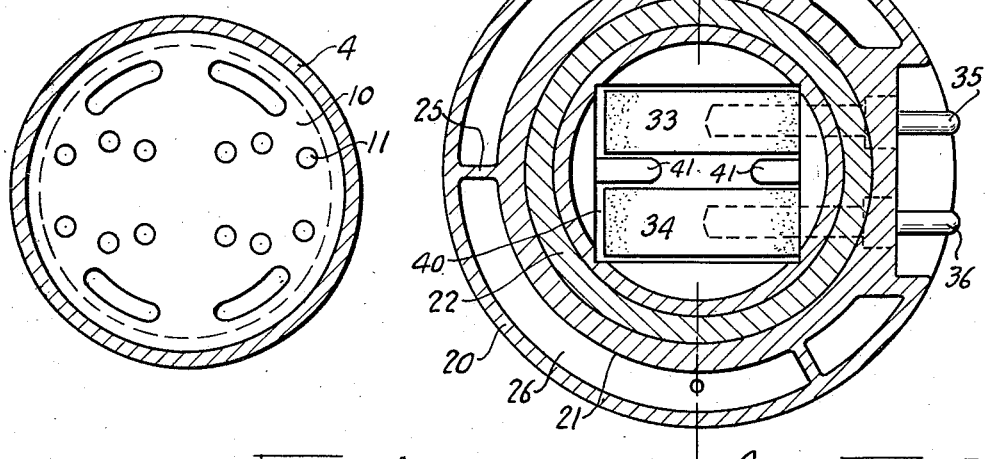
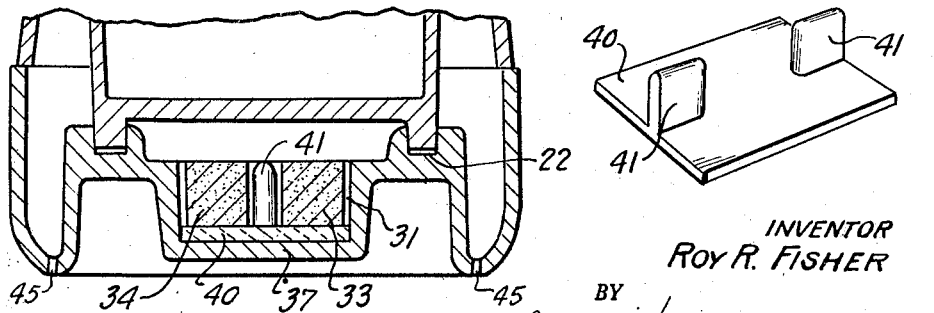

2,433,750

UNITED STATES PATENT OFFICE 2,433,750

ELECTRICAL HEATING DEVICE

Roy R. Fisher, Detroit, Mich.

Application February 23, 1946, Serial No. 649,618

5 Claims. (Cl. 219—40)

This invention relates to heating devices of the type where an electric circuit is completed by a quantity of water so that the flow of electric current results in vaporizing the water. The invention is concerned particularly with devices, such as bottle warmers, and bottle sterilizers for use in heating baby food and for sterilizing the bottles therefor. Accordingly, the invention is disclosed in connection with such devices although the invention is not limited to such uses.

Devices of the kind mentioned have heretofore been made of ceramic material and it is an object of this invention to make these devices of a plastic material which may be molded into shape.

Numerous advantages flow from heating devices for household use made from plastic substances, including, a lowered cost of production resulting in the provision of the devices to the users at a low cost, lightness in weight, ruggedness of construction, including resistance to breakage, the feasibility of providing desired and efficient shapes and contours and the provision of varied colors. In heating devices of the type mentioned, the same is provided with a sort of well or recess for containing spaced electrodes. A suitable quantity of water is placed in the well to thus close the circuit between the electrodes and the flow of the current causes vaporization. Thus, the device also provides a timing function in that when the water is evaporated, the circuit is broken and the heating discontinued. As an aid in the function of the device, the water may contain an additional substance such as a salt or soda.

It has been found, however, that the plastic material at the location of the well will not stand up satisfactorily and resist the action which takes place when the current flows across the electrodes. When the current flows across the electrodes through the water, the adjacent wall, which may be the bottom wall of the vessel, comprised of plastic, will "track" and thus the surface of the plastic substance is ruptured and then it is only a matter of a few seconds with some plastics and a minute or so with others when the plastic wall is destroyed.

In accordance with this invention, provision is made for protecting the wall against such destruction and while the body of the article in question is comprised of plastic, a protector, preferably of ceramic material, is placed in the critical location or locations to protect the same from the disintegrating action due to the current. Other objects of the invention reside in the provision of a novel structure for a heating device comprised of plastic and still other objects will be appreciated as the following detailed description is considered.

Fig. 1 is a cross sectional view taken through a bottle warmer constructed in accordance with the invention.

Fig. 2 is a sectional view taken substantially on line 2—2 of Fig. 1 showing the bottom construction.

Fig. 3 is a sectional view taken substantially on line 3—3 of Fig. 1.

Fig. 4 is a sectional view through the lower portion of the device taken at right angles to Fig. 1.

Fig. 5 is a perspective view of the protecting device.

Fig. 6 is a cross sectional view illustrating a bottle sterilizer.

Fig. 7 is a partial sectional view taken on line 7—7 of Fig. 6.

Fig. 8 is a view looking at the structure shown in Fig. 7 along the line 8—8 thereof.

A bottle warmer is illustrated in Fig. 1 comprised of an upper section 1 and a lower section 2. The upper section is fashioned with an outer wall 3 and an inner wall 4, these walls being spaced apart to form a heat insulating space 5, the walls being integrally united in a suitable rounded upper edge as at 6, and being reinforced by a suitable number of fillets or ribs 7 spaced circumferentially about the wall structure. The inner wall provides the sides of a receptacle having a bottom wall 10 and which bottom wall is provided with a suitable number of apertures 11, some of which may be circular or elongated as desired as shown in Fig. 3. The outer wall has a lower terminating edge 12 while the inner wall structure preferably has a depending circumferential flange 13.

The lower section 2 is formed with an outer wall 20, the upper edge of which is adapted to receive in seated fashion the edge 12 of the upper wall 3 and an inner partial wall 21 provided with a groove 22 for receiving the flange 13. When the two parts are assembled they are fitted together as shown in Figs. 1 and 4. Preferably a cement is used to the location of the interfitting flange 13 and groove 22 and to strengthen the structure a suitable number of screws 23 may be employed. The walls 20 and 21 may be reinforced by a number of fillets or ribs 25 (Fig. 2). Thus an insulating space 26 is provided which communicates with the space 5 so that the entire vessel is surrounded by this heat insulating space.

The central portion of the lower part is of thickened construction, as shown at 30, and is provided with a depression forming a sump or well 31 for receiving two electrodes 33 and 34 disposed in spaced relationship and provided with electrical contacts 35 and 36 extending through the wall to the exterior and adapted to receive a socket connector of an electrical conductor. When a quantity of water, such as a spoonful, is placed in the well, which can be done by pouring the water into the vessel, the same flowing through one or more of the apertures 11, it partially fills the well and bridges the space between the two electrodes to complete the circuit. The current flows from one electrode to another adjacent the bottom wall 37 of the lower section 2, particularly when the water is of but slight depth. This is the place where the current, in flowing from one electrode to another, causes the plastic to "track" so that the surface thereof is ruptured following which the life of the plastic is but a few seconds or minutes. There are of course numerous plastics available for use in the making of such heating devices. However, the preferred type of plastic is one which sets or cures by the application of heat and pressure. Plastics of this type include those known as "Bakelite" and "Melmac."

To overcome this situation, a suitable protecting device is employed as illustrated in Fig. 5. This resides in a plate-like body 40 arranged to be positioned in the bottom of the well so as to underlie the two electrodes. This protector may have upstanding projections or lugs 41 which lie in between the electrodes to maintain spaced relationship. The protector is preferably of a ceramic material and it may be of the type ordinarily employed as an electrical insulator. Various ceramics however may be employed. The plastic substance is protected from the current which flows across the electrodes since the immediate bounding wall across the space comprises the ceramic material. The plastic substance is thereby protected and is not subjected to the destructive action.

Preferably, the lower section is provided with one or more apertures 45 so that any moisture which might be trapped between the inner and outer walls may escape therefrom. In use, a bottle containing a suitable formula or other baby food, as represented by the dotted illustration 50, may be placed in the receptacle after the water has been placed in the well. When electrical current is applied the water is vaporized and the heat created warms the contents of the bottle. And, as mentioned above, the quantity of water introduced may be such as to perform the proper timing function. The double wall construction provides an insulating function so that the outer wall may remain relatively cool even though the water is boiling within the container. Thus, the device may be picked up and handled even though it is in operation without injury. Tests have shown that after water has been boiled in the container for as long as an hour, it may still be picked up and handled without burning the hand. And it is to be appreciated that normally the device only functions a few minutes at a time.

A sterilizer for bottles is illustrated in Figs. 6, 7 and 8. It is not necessary to go into the details of the construction of the sterilizer except to say that it has a plastic lower portion 51 and an upper removable closure 52 with a suitable support 53 for receiving a plurality of bottles 54 in an inverted position. The lower structure may be reinforced by suitable formed gussets 55 and it may be provided with supporting legs 56. The bottom of the lower portion is provided with a well 57 for receiving the two electrodes 58 and 59 with their electrical connections 60 and 61 while a protector is illustrated as 62 in the form of a plate resting upon the bottom wall of the well and which is provided with the lug projections 63 for lying in between the electrodes.

In the use of the sterilizer the water is placed in the well and the protector device protects the plastic in the manner above described. The vapor rises in the vessel which is closed by the closure piece 52 and has access to the inverted bottles for sterilizing the same.

I claim:

1. A heating device comprising a body of a thermo-setting plastic having a well, a pair of electrodes in the well disposed in spaced relationship and adapted to be connected into an electrical circuit, said well adapted to receive a quantity of water to close the electrical circuit across the electrodes, whereby the water is vaporized by the heat generated by the passage of electrical current, and a protecting device of ceramic material of plate-like form disposed in the well and lying between the plastic bottom of the well and the electrodes and covering the plastic bottom of the well to protect the plastic from destructive action due to the flow of current through the water.

2. A heating device comprising a body of a thermo-setting plastic having a well, a pair of electrodes in the well disposed in spaced relationship and adapted to be connected into an electrical circuit, said well adapted to receive a quantity of water to close the electrical circuit across the electrodes, whereby the water is vaporized by the heat generated by the passage of electrical current, and a protecting device of ceramic material of plate-like form disposed in the well and lying between the plastic bottom of the well and the electrodes and covering the plastic bottom of the well to protect the plastic from destructive action due to the flow of current through the water, said protecting device having at least one projection extending between the electrodes to maintain them in spaced relationship.

3. A heating device substantially as described comprising, an upper vessel portion of a thermo-setting plastic material having inner and outer walls integrally joined at their upper edges and spaced at their lower edges, a perforated bottom wall extending across the inner wall, a circumferential rib depending substantially from the inner wall, a lower section of thermo-setting plastic material having inner and outer walls and having a well adapted to receive spaced electrodes and a quantity of water, said well underlying the perforated bottom, the edges of the outer wall sections being in substantial contact with each other, the lower portion having a circumferential groove for receiving the rib on the upper portion and adapted to be interfitted for connecting the portions together.

4. A heating device substantially as described comprising, an upper vessel portion of a thermo-setting plastic material having inner and outer walls integrally joined at their upper edges and spaced at their lower edges, a perforated bottom wall extending across the inner wall, a circumferential rib depending substantially from the inner wall, a lower section of thermo-setting plastic material having inner and outer walls and having a well adapted to receive spaced electrodes and a quantity of water, said well underlying the perforated bottom, the edges of the outer wall sections being in substantial contact with each other, the lower portion having a circumferential groove for receiving the rib on the upper portion and adapted to be interfitted for connecting the portions together, and circumferentially spaced fillets in both the upper and lower portions extending across the space between the inner and outer walls thereof for reinforcing the same.

5. A heating device substantially as described comprising, an upper vessel portion of a thermosetting plastic material having inner and outer walls integrally joined at their upper edges and spaced at their lower edges, a perforated bottom wall extending across the inner wall, a circumferential rib depending substantially from the inner wall, a lower section of thermo-setting plastic material having inner and outer walls and having a well adapted to receive spaced electrodes and a quantity of water, said well underlying the perforated bottom, the edges of the outer wall sections being in substantial contact with each other, the lower portion having a circumferential groove for receiving the rib on the upper portion and adapted to be interfitted with a cement for uniting the upper and lower portions together and screws passing through the lower portion and into the rib of the upper portion.

ROY R. FISHER.

REFERENCES CITED

The following references are of record in the file of this patent:

UNITED STATES PATENTS

| Number | Name | Date |
|---|---|---|
| 2,230,245 | Hettinger | Feb. 4, 1941 |
| 2,363,365 | Schmitt | Nov. 21, 1944 |